United States Patent [19]

Martini et al.

[11] Patent Number: 4,947,687

[45] Date of Patent: Aug. 14, 1990

[54] DRIVE SYSTEM COMPRISING A VARIABLE SPEED DRIVING MOTOR, AN ADJUSTABLE HYDROSTATIC TRANSMISSION AND A GEAR-CHANGING MEANS

[75] Inventors: Stefan Martini, Ulm; Wolfgang Reistle, Langenau; Thomas Sommer, Blaustein, all of Fed. Rep. of Germany

[73] Assignee: Hydromatik GmbH, Fed. Rep. of Germany

[21] Appl. No.: 165,775

[22] Filed: Mar. 9, 1988

[30] Foreign Application Priority Data

Mar. 9, 1987 [DE] Fed. Rep. of Germany ....... 3707495

[51] Int. Cl.$^5$ .............................................. F16H 47/04
[52] U.S. Cl. ...................................... 74/733.1; 74/865
[58] Field of Search ................. 74/687, 718, 865, 866, 74/733

[56] References Cited

U.S. PATENT DOCUMENTS

| | | | |
|---|---|---|---|
| 3,903,756 | 9/1975 | Hamma | 74/687 |
| 3,908,377 | 9/1975 | Riedhammer | 60/445 |
| 3,913,325 | 10/1975 | Miyao et al. | 74/687 X |
| 3,969,958 | 7/1976 | Miyao et al. | 74/687 |
| 3,983,701 | 10/1976 | Jennings et al. | 60/465 |
| 4,188,789 | 2/1980 | Hamma | 60/444 |
| 4,192,199 | 3/1980 | Hamma et al. | 74/687 |
| 4,368,653 | 1/1983 | Mizuno et al. | 74/687 X |
| 4,446,756 | 5/1984 | Hagin et al. | 74/687 |
| 4,679,462 | 7/1987 | Baits et al. | 74/687 |
| 4,700,590 | 10/1987 | Omitsu | 74/866 |
| 4,776,233 | 10/1988 | Kita et al. | 74/687 |

FOREIGN PATENT DOCUMENTS

| | | |
|---|---|---|
| 2247437 | 9/1972 | Fed. Rep. of Germany . |
| 2307550 | 8/1974 | Fed. Rep. of Germany . |
| 2652976 | 5/1978 | Fed. Rep. of Germany . |
| 3433494 | 3/1986 | Fed. Rep. of Germany . |
| 3433495 | 3/1986 | Fed. Rep. of Germany . |
| 2161553 | 1/1986 | United Kingdom .................. 74/687 |

Primary Examiner—Dwight Diehl
Assistant Examiner—Chris Campbell
Attorney, Agent, or Firm—Scully, Scott, Murphy & Presser

[57] ABSTRACT

A drive system, comprising a driving motor whose speed can be adjusted by means of an operating member, an adjustable hydrostatic transmission with a pump and a hydraulic motor of which the volume throughput can be adjusted, followed by a change-speed gear, in particular one which can be shifted under load, connected to the hydrostatic transmission, wherein a control device is associated with the hydrostatic transmission, and an operating member is provided to initiate a gear shift, is arranged so that while ensuring a simple regulating concept, it exhibits subjectively good shifting behavior without costly auxiliary devices having to participate in the control response of the continuously adjustable hydrostatic transmission. This is achieved by the fact that associated with the control device is a device for determining the direction of transmission of power between the driving motor and the change-speed gear, and that after the initiation of a gear-change to a lower gear when the direction of transmission is from the change-speed gear to the driving motor, the control device adjusts the transmission ratio of the hydrostatic transmission towards a decrease in the driving speed of the hydraulic motor and that the shift can only take place at the earliest when the direction of transmission has come to be from the driving motor to the change-speed gear.

15 Claims, 4 Drawing Sheets

DRIVE SYSTEM COMPRISING A VARIABLE SPEED DRIVING MOTOR, AN ADJUSTABLE HYDROSTATIC TRANSMISSION AND A GEAR-CHANGING MEANS

TECHNICAL FIELD OF THE INVENTION

The invention relates to a drive system.

BACKGROUND OF THE INVENTION AND PRIOR ART

Convertors such as continuously adjustable hydrostatic transmissions comprising at least one pump and at least one hydraulic motor in at least one of which the volume throughput can be adjusted, are used in drives of driven machines or vehicles. In a transmission of this kind the maximum conversion range is given by the ratio of the sizes of the pump and the motor and of their speeds. One way of further widening the conversion ratio of the drive system beyond this is to use change-speed gears, preferably ones which can be shifted when the drive is under load (load shift gears).

Complex control means ensures that the discontinuous changes of the speed ratio in the drive which are caused by shifting the change-speed gear are at least partially compensated by an inversely proportional adjustment of the continuously adjustable hydrostatic transmission in order to increase reliability and driving comfort or to protect components from sudden alterations in load (cf. DE-OS 23 07 550, 26 52 976, 34 33 494).

When using the machines or vehicles mentioned in the introduction, such as, in particular, construction vehicles there is not only normal operation under load in which there is a positive transmission of power to the change-speed gear from the driving motor, but also so-called overrun operation in which, after reversal of the transmission, there is negative power transmission, i.e. in which the power is transmitted to the driving motor from the change-speed gear.

In the known arrangements, when shifting down to a low gear stage the output speed of the hydrostatic transmission is increased from the speed at the time in order to match this output speed of the hydrostatic transmission to the synchronization point preset by the gear stage and thus to achieve a smooth or relatively smooth shift. This applies particularly in the case of negative powder transmission, as the speed of the driving motor falls by a certain amount owing to the brief interruption or the reduction of the power transmitted when shifting (motor compression). This does not correspond to the basic purpose of changing the gear stage, which is to slow down the machine or the vehicle.

OBJECT OF THE INVENTION

The object of the invention is to develop a regulating concept that is as simple as possible, exhibits subjectively good shifting behavior without costly auxiliary devices having to participate in the control response of the continuously adjustable hydrostatic transmission.

SUMMARY OF THE INVENTION

In the arrangement according to the invention, when shifting down in the overrunning operation the output speed of the hydrostatic transmission is not increased in the usual way, but is decreased by reduction of throughput of the pump, which in the case of negative power transmission is functioning as a motor, and/or by a reduction of the amount of throughput of the motor, which is functioning as a pump, and thus increases the transmission ratio $$i = n_{input\ speed}/n_{output\ speed}$$

A braking process is thus initiated by which means the output speed of the drive system or the speed of the driven machine is decreased until the speed of rotation or speed corresponding to the setting of the operating member (gas pedal) in the next lower gear is reached. According to the setting of the operating member it can also be brought to a standstill by this means. This can result from the automatic action of return members, such as springs, on the adjusting device for the pump or the hydraulic motor. On the other hand it is possible, within the scope of the invention, to bring about the reduction of the output speed according to the invention by means of a control process.

According to the invention the overrun operation is converted to a slower speed. Owing to this increase in the transmission ratio (hydrostatic transmission instead of the mechanical gear) both the overrunning operation and also the expectations of the operator are responded to.

Shifting only takes plce when a sufficiently high load, in particular a positive transmission of power from the diesel motor to the driving axle, is reached.

Within the scope of the invention the driver can also preset the positive transmission of power or the power by operating the operating member, and thus bring about a relatively smooth or smooth shifting process.

According to the invention shifting down only occurs when there is positive power transmission. The invention thus takes account of the discovery that when shifting down with positive power transmission the speed of the driving motor and the output speed of the hydrostatic transmission are increased owing to the temporary cessation of the effective torque during the shifting, and thus automatically approach the speed after the shift, whereby the shift can take place smoothly or relatively smoothly by a simple independent process, possibly without a special or controlled synchronization process.

The arrangement according to the invention is particularly suitable for converters that are controlled according to the speed of the driving motor (speed controller).

In order to obtain a certain functional reliability it is advantageous to carry out the shifting when there is sufficiently large positive power transmission.

The arrangement according to the invention not only allows the direction of transmission to be set in a simple manner but also enables it to be determined simply especially when there is negative power transmission. An advantageous possibility consists in comparing the input and output speeds of the hydrostatic transmission, or signals synchronous therewith, with a particular characteristic.

In the case of power transmission from the working machine to the driving motor, e.g. in the overrunning operation of the vehicle or in constant drive, the pump delivery is decreased by operating the pre-selector switch to the next lower gear and the speed or speed of rotation of the drive system or of the machine driven by it is decreased until either it comes substantially to a standstill or the driver, by operating the throttle lever, selects a large enough load for a relatively smooth switching process to be initiated. The control means is able to recognize this drive situation (acceleration) by means of the corresponding signal transmitters and to control the drive system correspondingly.

It is also possible within the scope of the invention to determine whether there is a positive and/or negative transmission of force or power by monitoring the high pressure and/or low pressure in the hydrostatic transmission (main line sections) by means of pressure gauges.

In the arrangement according to the invention the delivery volumes of the pump and/or thhe hydraulic motor can, by means of the control means, be adjusted in accordance with the input speed of the hydrostatic transmission and a selector switch for forward or backward travel, and a second control means can also be provided which, depending on a gear stage pre-selector switch and the speed signals from the input shaft and the output shaft of the hydrostatic transmission, carries out the switching of the conversion range by correspondingly switching shifting elements of the change-speed gear, and can influence the adjusting signal of the delivery intake volume or the adjusting device.

If two pumps or hydraulic motors are arranged in parallel and can be started individually or together it is advantageous to bring about their volume adjustments preferably by the first control means.

It is also possible, during the change-over of the conversion range for the purpose of reducing the transmission ratio between the speeds of the input shaft and the drive shaft or output shaft of the hydrostatic transmission part (by shifting to the next higher gear stage of the gear-changing device or reducing the intake volume of the hydraulic motor by hydraulically and/or mechanically switching off or changing-over the hydraulic motors present in the power branch of the hydrostatic transmission part), for the second control means to participate in the adjusting signal of the pump and/or the hydraulic motor so that the delivery volume of the pump is decreased and/or the intake volume of the hydraulic motor is increased and as a result the volume flow from the pump to the hydraulic motor, approaches the volume flow expected after the change-over (pre-synchronization).

Provision can also be made that shifting the gear stage pre-selector switch to an increased transmission ratio between the speeds of the input shaft and the output shaft of the hydrostatic transmission is only converted by the control means into a shift of the shifting elements when the speed of the output shaft of the hydrostatic transmission at the time is increased by a computer so that the change in the transmission ratio expected by the change-over device does not exceed the maximum permissible speed of the hydraulic motor (safety switch) and the speed ratio between the input shaft ad the output shaft exceeds a certain value, and in all other driving conditions, by overriding the adjusting signal by the control means. The delivery and/or intake volumes of the pump or the hydraulic motor are adjusted such that the aforementioned driving condition is automatically set and that this driving condition, advantageous for shifting the shifting elements, can be reached in a shorter time by increasing the load condition of the driving motor (acceleration).

It is also possible, within the scope of the invention, to prevent the shifting of the shifting elements by means of an external option circuit.

The arrangements according to further embodiments simplify control, firstly by subdividing the control region and secondly by utilizing reliable controlling means. In the case of one arrangement a special control means simultaneously influences the hydraulic motor, whereby the conversion ratio can be considerably increased in a simple manner.

In further embodiments simple and functionally reliable measures are given which enable the power to be ascertained, i.e. whether the drive system is in the normal load operation or in the overrun operation. The data from the revolution counter are also used in order to bring about exact and purposeful control.

In further embodiments are given in order to vary the conversion ratio of the hydrostatic transmission.

BRIEF DESCRIPTION OF THE DRAWINGS

The invention will now be described in more detail with reference to preferred exemplary embodiments shown in simplified drawings, in which.

DETAILED DESCRIPTION OF PREFERRED EMBODIMENTS OF THE INVENTION

Figure 1:
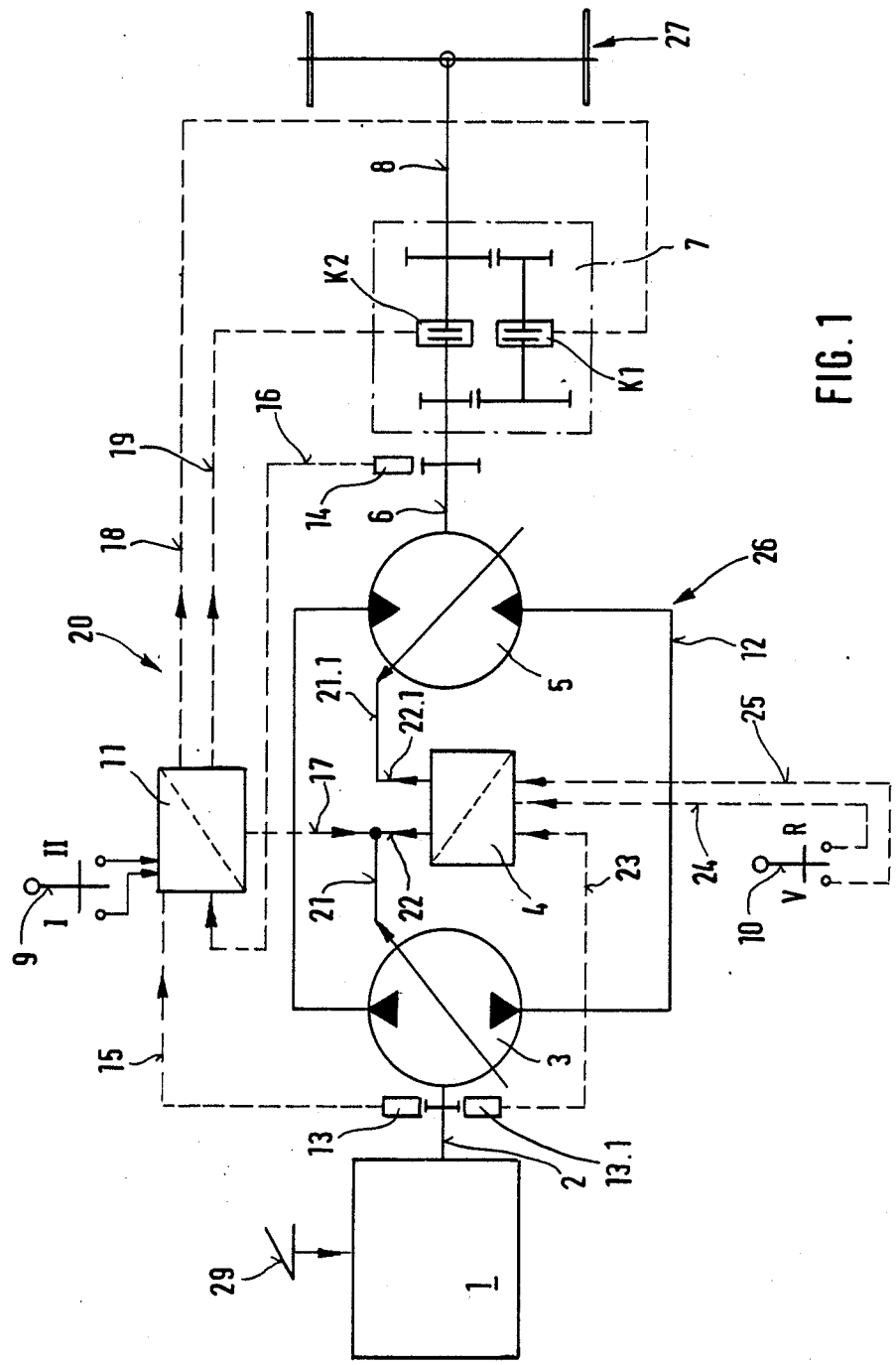
FIG. 1 shows in a diagrammatic representation a drive system according to the invention.

The essential parts of the drive system shown in FIG. 1 are a variable speed driving motor 1, e.g. an internal combustion engine such as a diesel motor, having a driving shaft 2, a pump 3 driven by the latter with adjustable delivery volume which is installed to operate in both directions, a control device 4, a hydraulic motor 5 which is also installed to rotate in both directions and with its output shaft 6 in driving connection with a load gear shift 7 of which the output shaft is indicated by 8, a pre-selector element 9 with two functional settings I and II for the pre-selection of a first and a second gear stage, namely first and second gears, a further pre-selector element 10 for forward and backward travel V and R respectively, a further control device 11, one and/or two revolution counters 13, 13.1 respectively associated with the driving shaft 2 or the shaft of the pump, which in the case of a diesel motor are conveniently terminals or generators, and a revolution counter 14 associated with the output shaft 6 of the hydraulic motor 5. It should be understood that although FIG. 1 shows only a single pump 3 and a single hydraulic motor 5, that a plurality of pumps and motors may be provided and that anyone with ordinary skill in the art would be able to make the necessary connections and additions to accommodate the plurality of pump and motors.

The two control devices 4, 11 are shown in a simplified way. The electronic control device indicated by 11 is connected by signal lines 15 to 19 to the revolution counters 13 and 14, to an adjusting device 21 for the pump 3 and to the shifting elements K1 and K2, which may be similar to clutches, associated with the load gear shift 7. The control device 11 ascertains if a positive or negative power flow is present between the driving motor 1 and the load gear shift 7, it participates in the control of the adjusting means 21 and causes the load gear shift to be shifted. The control means is generally indicated by 20.

The control device 4 is connected by means of signal lines 22 to 25 to adjusting means 21, 21.1, only indicated in outline, to the revolution counter 13.1 and to the pre-selector element 10. The control device 4 is a speed controller with a speed dependency expressed by the signal line 22 and the revolution counter 13.1. The arrangement is preferably such that the control device 11 overrides the control device 4 after pre-selection of the lower gear I and when there is a negative power flow, i.e. it participates in the control process of the control device 4.

The functioning of the drive system according to FIG. 1 will now be described.

The driving force applied by the driving motor 1 is, by means of the adjustable hydrostatic transmission 26 formed by the pump 3, the hydraulic motor 5 and a main line 12, transmitted to the load geaar shift 7 whose output shaft 8 is connected with a working machine, in particular a construction machin or a construction vehicle such as a wheel loader, the running gear of which is indicated by 27.

Figure 2:
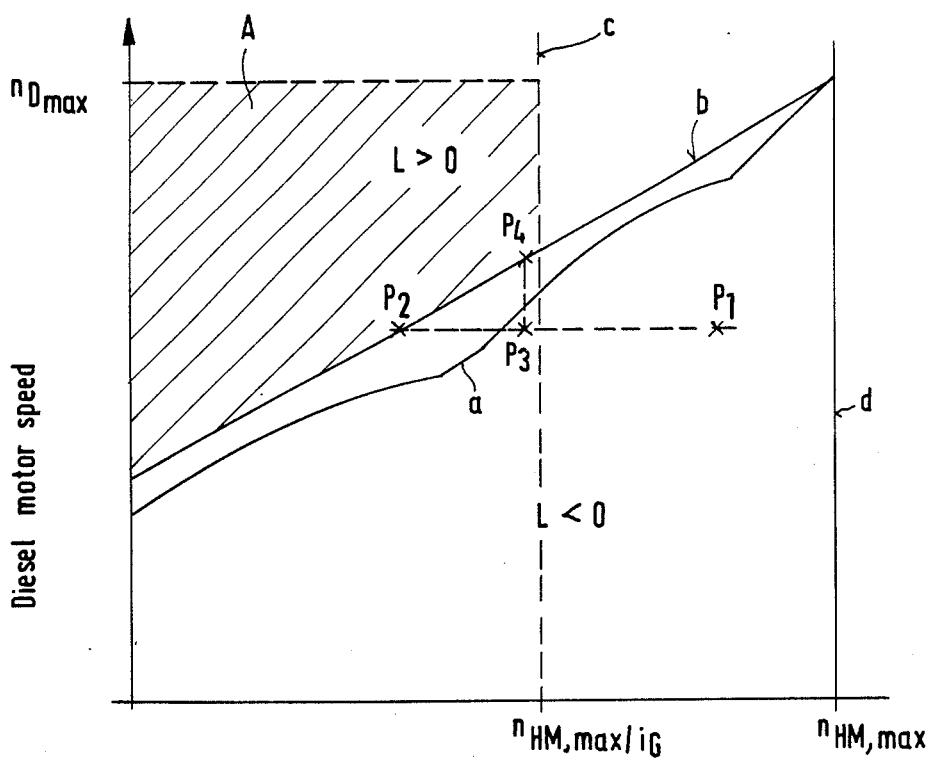
FIG. 2 shows a functional diagram for the drive system.

In the functional diagram according to FIG. 2, in which the speed $n_D$ of the driving motor 1 is plotted graphically against the speed $n_{HM}$ of the hydraulic motor, the curve a shows a control characteristic of the control device 4, namely the dependency of the speed $n_{HM}$ of the hydraulic motor on the speed $n_D$ of the driving motor, in a load-free condition, i.e. in a condition in which the wheels or the running gear 27 of the wheel loader are not loaded, as is the case e.g. on a test rig on which the wheels and/or the running gear can turn freely. The curve as thus shows the speeds $n_{HM}$ of the hydraulic motor 5 as a function of the setting of an accelerator (gas) pedal 29 controlling the driving motor 1 according to the control characteristic of the control device 4 in the quasi-non-loaded condition of the drive system. The control device 11 of the control means indicated generally by 20 makes it possible to determine, using a comparison of the speeds ascertained by the revolution counters 13 and 14 which show variation of speed in operation, i.e. with a load acting on the running gear 27, with a characteristic b stored in the control device 11, whether there is positive or negative power, i.e. whether the driving force is transmitted from the driving motor 1 to the load gear shift 7 (normal load operation) or from the latter and/or from the running gear 27 to the driving motor 1 (overrun operation).

The vertical line c shows the boundary region of the gear stage I, namely a specific maximum speed $n_{HMmax}$ in the gear stage I, and the vertical line d shows the upper limit of the gear stage II, namely the maximum speed $n_{HMmax}$ in the gear stage II. Beneath the characteristic b the overrun operation occurs, as indicated by the reference characters $L<0$ (power less than zero) and above the line b normal load operation occurs, as indicated by the reference characters $L>0$ (power greater than zero). The hatched region indicated by A in the functional diagram above the line b thus shows the region in which the invention comes into effect according to one principal aspect.

The direction of travel—forwards (V) or backwards (R)—and the gear stages I or II are preselected at the pre-selector elements 9, 10. In the case of positive power the transmission ratio of the hydrostatic transmission 26 is set according to the control characteristic preset in the control device 4. For the function to be described it is assumed that the wheel loader or a bulldozer is loaded and is driving forwards to a truck and in gear stage 11 in order to load the excavated material.

In order to initiate a shift from gear stage II to gear stage I the pre-selector lever 9 must be operated accordingly, i.e. to the shift position I. If the control device 11 then ascertains that there is overrun operation, in this case by the reduction of speed of the wheel loader in front of a truck, the control device 11 initiates a decrease in the volume throughput of the pump 3 now operating as a motor, and/or an increase of the volume throughput in the hydraulic motor 5, now operating as a pump, and thus initiates a braking action until the driving speed corresponding to the driving pedal position in first gear is reached. In this process the control device 4 is overridden and the control device 11 then acts on the operating means 21, 21.1 which is indicated in outline. Now that there is positive power, the shift into the first gear takes place through transmission of signals from the control device 11 over the signal line 18 or 19 to the respective coupling K1 or K2. When shifting down from gear stage II to gear stage I with sufficient positive power no special measures are necessary, and there is no need to adapt the speed deliberately to the change in ratio, because with the temporary interruption of the drive connection between the running gear 27 and the hydraulic motor 5 the latter is accelerated whereby an approximation or matching of the output speed of the hydrostatic transmission 26 to the change in ratio occurs automatically so that a relatively smooth or smooth shift is also possible here.

These shifts can take place as described in DE-OS 34 33 494 and 34 33 495. So as to avoid repetition reference is made to these publications, the disclosure of which is incorporated herein by reference.

In the present drive system there are also two further shifting conditions, namely shifting up and shifting down in normal operation under load.

When shifting up from gear stage I to gear stage II the delivery of the pump 3 is decreased and/or the intake volume of the hydraulic motor 5, and as a result the transmission ratio of the hydrostatic transmission, is increased for a short time that is needed and/or set for shifting, i.e. for emptying and filling the multiple-disk clutches K1 and K2 respectively. By this means the output speed of the hydrostatic transmission 26 is reduced and thus the speed change required by the shift is matched or approximated to, whereby a relatively smooth shift is again achieved.

The control device 11 is arranged such that the shifting procedure is always only carried out when the input speed of the change-speed gear 7 to be expected after the shifting procedure does not exceed a specific output speed of the hydrostatic transmission 26. In the present exemplary arrangement this is the constructively preset maximum speed of the hydraulic motor 5.

Figure 3:
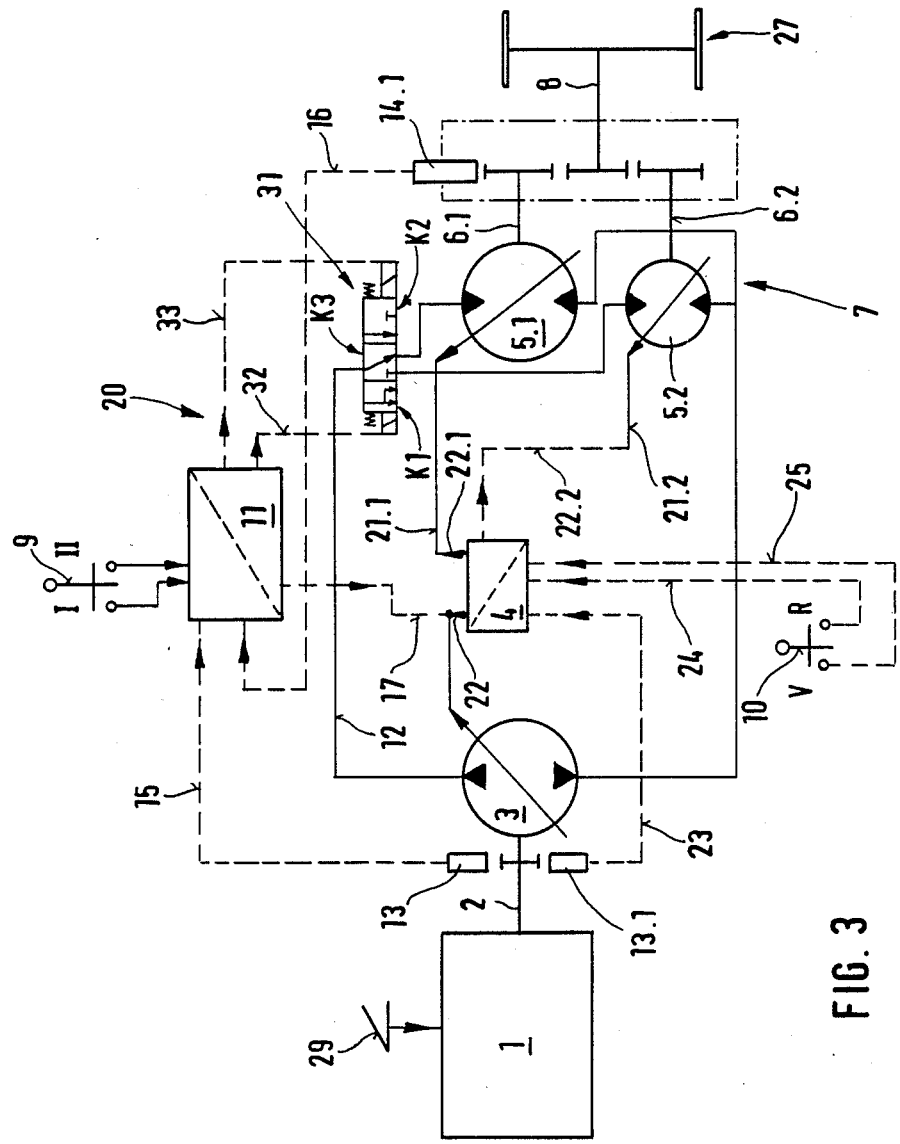
FIG. 3 shows a variation of the drive system.

In the exemplary embodiment according to FIG. 3 the load shift gear 7 is integrated in the hydrostatic transmission 26. There are two hydraulic motors 5.1, 5.2 with adjustable intake volumes which are installed to operate in both directions of rotation. The means of adjusting the hydraulic motors 5.1, 5.2 are indicated by 21.1 and 21.2, and they are acted on by the control device 4. The hydraulic motors 5.1 and 5.2 can be started individually or together as desired by means of a control or regulating valve 31 arranged in the main line 12 and controlled by the control device 11. Three shifting stages K1 to K3 are thus provided which can be engaged by way of three shifting positions of the control or regulating valve 31, which in the present exemplary embodiment comprises a 3/3-way directional control valve which can be controlled electrically. The control lines, which can be compared with the signal lines 18 and 19 of the first exemplary embodiment, are indicated by 32 and 33. As the hydraulic motors 5.1, 5.2 can also be started individually each output shaft 6.1, 6.2 has associated with it a revolution counter (not shown) or alternatively, depending on the design of the gear, a common revolution counter 14.1 can be associated with the gear 7.

Figure 4:
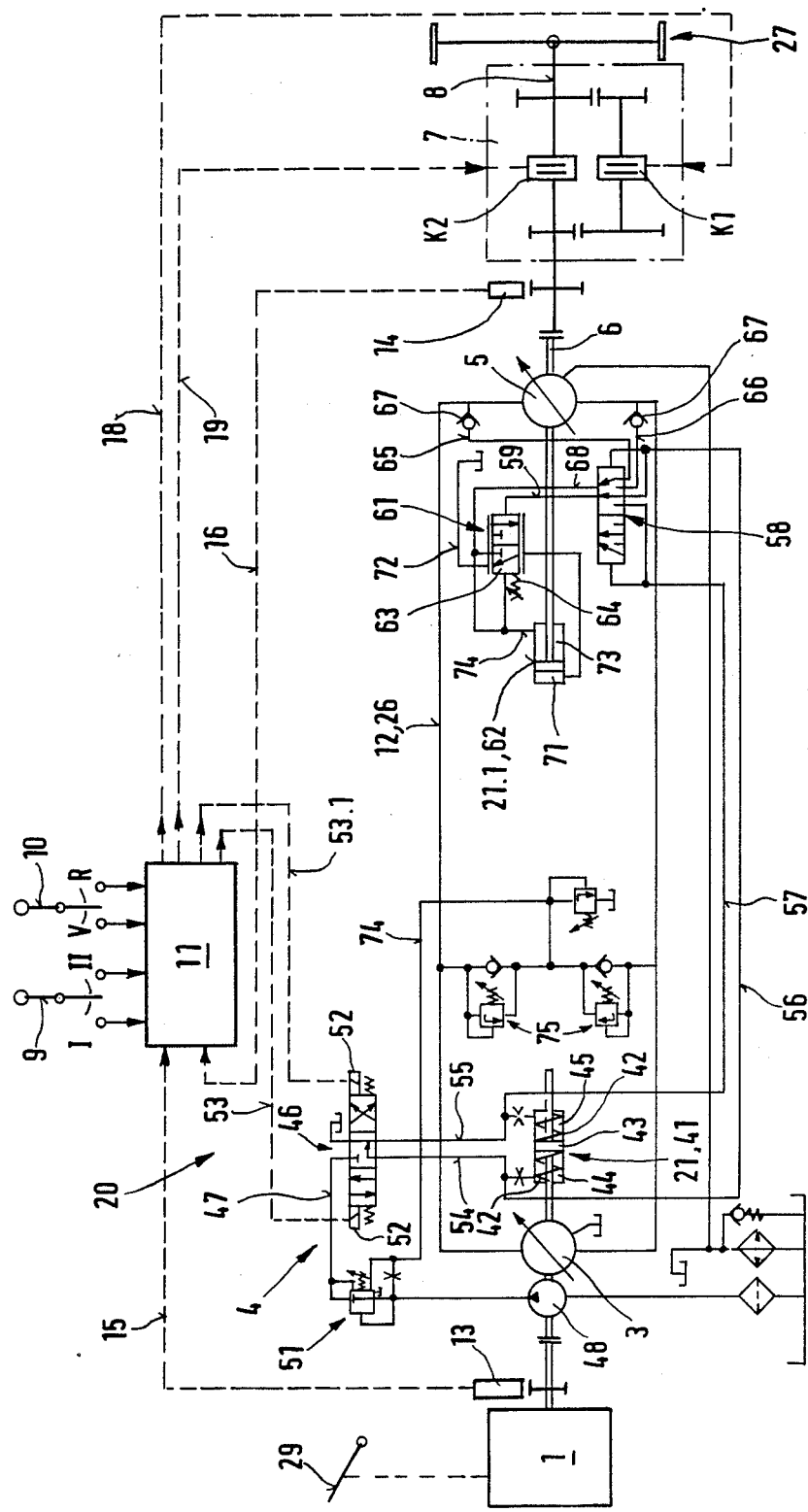
FIG. 4 shows in a diagrammatic representation, a drive system according to the invention as a further exemplary embodiment.

The exemplary embodiment according to FIG. 4, in which the same parts are indicated by the same reference numerals, differs from the exemplary arrangement according to FIG. 1 inter alia in that the control device 4 comprises a hydraulic control device, namely a speed and power control for the hydrostatic transmission 26. This control device 4 is of the kind described in DE-PS 22 47 437, and reference is made to the valve indicated by the reference numeral 10 in that publication. The pre-selector element 10 corresponds to the change-over or directional control valve indicated by the reference numeral 23 in that publication. To avoid repetition reference is made to the whole of the description contained in DE-PS 22 47 437, the disclosure of which is incorporated herein by reference.

The pump 3, of which the delivery is also adjustable in both directions of rotation, is adjusted by means of a hydraulic cylinder 41 of which the double piston 43, centred by springs 42, can be adjusted by pressurizing the working chambers 44, 45 as desired. For this purpose a directional control valve 46 is used, which with the pre-selection of either the forward drive or backward drive (V, R), serves to connect one or the other working chamber 44, 45 to a hydraulic line 47 into which an auxiliary pump 48 operated synchronously with the pump 3 delivers. Arranged in the hydraulic line 47 is a so-called pressure balance, consisting of a throttle (not shown) and a pressure control valve 51 which is arranged after it in the direction of flow and is adjustable by the auxiliary pressure present in the hydraulic line 47 in front of the throttle. Associated with the directional control valve 46 are switching magnets 52 which can also comprise proportional magnets which act against springs, preferably adjustable, indicated only in outline and which are controlled by way of electric signal lines 53, 53.1 from the control device 11.

The hydraulic control device 4 is also installed so as to act on the adjusting means 21.1 of the hydraulic motor 5. For this purpose line sections 56, 57 leading off from the line sections 54, 55 extending between the directional control valve 46 and the hydraulic cylinder 41 serve to pressurize a switching valve 58 which controls their passage to a common control line 59 by means of which a pressure control valve can be acted on which adjusts an adjusting means 21.1 which likewise comprises a hydraulic cylinder 62. The valve spool 63 of the pressure control valve 61 is acted on on the one side by the auxiliary pressure of the hydraulic control device 4 and on the other side by the, if necessary, reduced working pressure of the hydrostatic transmission 26, and at the same time is acted on by a spring 64, which is preferably adjustable. The working pressure is supplied through the line sections 65, 66 extending from the main line 12 in front of and behind the hydraulic motor 5, in which are arranged check valves 67 which open towards the switching valve 58 whose connection to a common control line 68, that pressurizes the control spool 63, is also controlled by the switching valve 58. The pressure control valve 61 is arranged in a return line 72 extending from the working chamber 71 of the hydraulic cylinder 62. The other chamber 73 of the hydraulic cylinder 62 is connected to the control line 68 by way of a line section 74 and can thus be acted on by the working pressure. As a result both the working pressure and the auxiliary pressure act as control pressures on the pressure control valve 61 and as adjusting pressure on the piston of the hydraulic cylinder 62.

The arrangement is such that the hydraulic motor 5 is in the maximum intake volume setting when the delivery volume setting of the pump 3 is adjusted to a minimum, and vice versa. In addition the arrangement is then such that the hydraulic motor 5 is only adjusted towards minimum intake volume when the pump 3 has reached its maximum delivery setting. The directional control valve 46 controls both the pump 3 and the hydraulic motor 5 in respect of the corresponding direction of rotation at the time.

The auxiliary circuit also serves at the same time to supply the main line 12 of the hydrostatic transmission 26, with a line 74 extending from the pressure control valve 51 serving this purpose. Indicated by 75 are pressure limiting valves for the working pressure of the hydrostatic transmission 26.

When overrunning, a down shift from gear stage II to gear stage I also takes place in this exemplary embodiment only when the deliver volume of the pump 3 has been decreased and/or the intake volume of the hydraulic motor 5 has increased and after the resulting braking action.

When shifting up from the gear stage I to gear stage II a decrease in the delivery volume of the pump 3 and/or an increase in the intake volume of the hydraulic motor 5 likewise occurs in the manner aforementioned during the response time of the couplings K1 and K2, but in this case for the purpose of reducing the output speed of the hydrostatic transmission 26 and adapting it to the speed determined by the change in ratio. This can be brought about by means of a control—in this case by acting on or switching off the control valve 47 by the control device 11 in the middle position—over a finite and possibly always constant time span or one that is dependent on the load condition, by means of which at least an approximation of the speeds is reached.

Switching off can be brought about in a simple manner by switching off the electric action on the directional control valve 46, whereupon its spool takes up the middle position in which the control flow to the adjusting cylinder 41 is interrupted. The result is an automatic return of adjusting cylinder 41 of the pump 3 by the springs 42 in the direction output=0, and of the adjusting cylinder 62 of the hydraulic motor 5 in the direction of maximum intake volume.

In the exemplary arrangement according to FIG. 4, in a manner comparable to that described in the aforementioned exemplary arrangement, the output speed of the hydrostatic transmission, in the regions L<0 or nHM>nHMmax, is decreased (braking action) by the increase of its transmission ratio, and by switching off the control valve 47 as described before.

It is however also possible, within the scope of the invention, when shifting down in the normal operation under load as well as when shiafting up, by means of the control valve 47 to reach synchronization of the output speed of the hydrostatic transmission 26 with the speed determined by the change in gear, i.e. by a corresponding decrease or increase of the transmission ratio of the hydrostatic transmission 26, by control and comparison of the output speed with the speed of the gear. In addition the respective gear speed can be set in the control device 11 (gear stage I or II). In a case such as this it is advantageous if the control valve 46 is a proportional valve, so that the adjustment can be done in a simple manner.

What is claimed is:

1. A drive system comprising
   a driving motor the speed of which can be varied by means of an operating member,
   an adjustable hydrostatic transmission comprising a pump and a hydraulic motor with a variable delivery and/or intake volume and a transmission ratio,
   a change-speed gear, especially one that can be shifted under load, following the hydrostatic transmission,
   a control means associated with the hydrostatic transmission, and
   an operating element for initiating a gear change, wherein
   said control means has associated with it means for determining a direction of power transmission between the driving motor and the change-speed gear, said control means comprising two control devices, the said first of which effects the gear change and the second sets throughputs of the pump and/or the hydraulic motor, said first control device being an electronic control device;
   whereby after initiation of a gear change into a lower gear when the direction of power transmission is from the change-speed gear to the driving motor said control means changes the transmission ratio of the hydrostatic transmission so as to reduce the output speed of the hydraulic motor; and
   whereby the shifting of the change-speed gear takes place no sooner than when the direction of transmission takes place from the driving motor to the change-speed gear.

2. A drive system according to claim 1 wherein the shifting after the direction of transmission has been attained only takes place when the power transmission has a predetermined value that is set depending on the output speed of the hydrostatic transmission at the change-speed gear in the lower gear into which it is to be shifted.

3. A drive system according to claim 1, wherein the shifting is only performed when an expected post-change input speed of the change-speed gear does not exceed a definite or constructively preset output speed of the hydrostatic transmission.

4. A drive system according to claim 1, wherein the power and/or the direction of transmission is determined from a ratio of the input and output speeds of the hydrostatic transmission.

5. A drive system according to claim 1, wherein the power and/or the direction of transmission is determined from a relationship between the position of a gas pedal of the driving motor and the input or output speed of the hydrostatic transmission.

6. A drive system according to claim 1 wherein the power and/or the direction of transmission is determined from a pressure difference between a high and low pressure in a closed circuit of the hydrostatic transmission.

7. A drive system according to claim 1, wherein said second control device is a hydraulic control device.

8. A drive system according to claim 7, wherein said second control device is an auxiliary pump driven synchronously with the driving motor and has at least one adjusting means, acted on by an auxiliary pressure thereof, for adjusting the pump and/or the hydraulic motor.

9. A driving means according to claim 8, wherein said first control device is an electronic control device and said adjusting means has a cylinder connected to an adjusting member of the pump or the hydraulic motor and a cntrol valve controlling pressurization of the cylinder that can be controlled by said electronic control device and is preferably a valve for changing the direction of travel.

10. A drive system according to claim 9, wherein the means for adjusting the hydraulic motor has associated with it a conytrol valve that can be acted on by the auxiliary pressure and/or a working pressure of the hydrostatic transmission.

11. A drive system according to claim 1, wherein said second control device is a speed or power controller for the hydraulic transmission.

12. A drive system according to claim 1, wherein a drive shaft of the driving motor, or a component rotating synchronously therewith, and an output shaft or the hydrostatic transmission of a component rotating synchronously therewith each have associated therewith at least one revolution counter operatively connected to the control means, and preferably with an electronic control device comprised in said control means.

13. A drive system according to claim 12, wherein the power and/or the direction of transmission are determined by comparison of operational characteristics of the input and/or output speed of the hydrostatic transmission, or of a variation of a speed synchronous therewith, with characteristics stored as characteristic curves (a,b) in the control means, preferably in said electronic control device.

14. A drive system according to claim 1, wherein the hydrostatic transmission includes a plurality of hydrostatic motors having delivery or intake volumes which are constant or are adjustable individually or in total.

15. A drive system according to claim 14, wherein at least two pumps or hydraulic motors are arranged in parallel and can be started separately or together.

* * * * *

UNITED STATES PATENT AND TRADEMARK OFFICE
CERTIFICATE OF CORRECTION

PATENT NO. : 4,947,687

DATED : August 14, 1990

INVENTOR(S) : Stefan Martini, et al.

It is certified that error appears in the above-identified patent and that said Letters Patent is hereby corrected as shown below:

Column 1, Line 48, "powder" should read as --power--.

Column 2, Line 53, "the invention" should read as --a second embodiment--.

Column 3, Line 13, "thhe" should read as --the--.

Column 3, Line 57, "ad" should read as --and--.

Column 4, Line 14, after "embodiments" insert --arrangements--.

Column 4, Line 56, "pump" should read as --pumps--.

Column 5, Line 17, "geaar" should read as --gear--.

Column 5, Line 33, "as" should read as --a--.

Column 6, Line 48, after "smooth" insert --or smooth--.

Column 7, Line 30, "centred" should read as --centered--.

Column 7, Line 51, "of" should read as --on--.

Column 8, Line 61, "nHM>nHMmax," should read as --$n_{HM} > n_{HMmax}$--.

Column 10, Line 3, Claim 5, "the" should read as --a--.

Column 10, Line 23, Claim 9, "cntrol" should read as --control--.

UNITED STATES PATENT AND TRADEMARK OFFICE
CERTIFICATE OF CORRECTION

PATENT NO. : 4,947,687
DATED : August 14, 1990
INVENTOR(S) : Stefan Martini, et al.

It is certified that error appears in the above-identified patent and that said Letters Patent is hereby corrected as shown below:

Column 10, Line 29, Claim 10, "conytrol" should read as --control--.

Column 10, Line 37, Claim 12, "or" should read as --of--.

Column 10, Line 38, Claim 12, "of" should read as --or--.

Signed and Sealed this

Twenty-fifth Day of February, 1992

Attest:

HARRY F. MANBECK, JR.

*Attesting Officer*  *Commissioner of Patents and Trademarks*